United States Patent [19]

Hülshoff et al.

[11] Patent Number: 4,899,287

[45] Date of Patent: Feb. 6, 1990

[54] PROCESSOR FOR SEWING MACHINES

[75] Inventors: Hartmut Hülshoff, Bad Wimpfen; Peter Kothe, Darmstadt-Eberstadt; Michael Luft, Darmstadt; Ulrich Schütz, Darmstadt-Arheiligen, all of Fed. Rep. of Germany

[73] Assignee: Quick-Rotan Elektromotoren GmbH, Darmstadt, Fed. Rep. of Germany

[21] Appl. No.: 162,245

[22] Filed: Feb. 29, 1988

Related U.S. Application Data

[63] Continuation of Ser. No. 887,111, filed as PCT EP85/00620 on Nov. 13, 1985, published as WO86/03034 on May 22, 1986, abandoned.

[30] Foreign Application Priority Data

Nov. 13, 1984 [DE] Fed. Rep. of Germany ....... 3441485

[51] Int. Cl.$^4$ ....................... G06F 15/46; D05B 19/00
[52] U.S. Cl. ............................... 364/470; 112/121.11; 112/457; 364/191
[58] Field of Search ............... 364/400, 470, 188, 189, 364/191-193, 200, 900; 112/121.11, 121.12, 445, 455, 456, 457, 458, 272, 275, 277

[56] References Cited

U.S. PATENT DOCUMENTS

| | | | |
|---|---|---|---|
| 4,189,773 | 2/1980 | O'Meara | 364/200 |
| 4,403,558 | 9/1983 | Martell et al. | 112/121.11 |
| 4,429,364 | 1/1984 | Maruyama et al. | 364/400 |
| 4,446,520 | 5/1984 | Shigeta et al. | 364/400 |
| 4,586,123 | 4/1986 | Plassmeier | 364/470 X |
| 4,602,577 | 2/1986 | Kothe et al. | 112/121.11 |

*Primary Examiner*—Joseph Ruggiero
*Attorney, Agent, or Firm*—Antonelli, Terry & Wands

[57] ABSTRACT

Processor arrangement for sewing apparatus for the operational control of at least one sewing device, including accessories, and for regulating the rotational speed of a positioning drive mechanism which drives the sewing device. The operating control characteristics as well as the rotational speed control characteristics are predeterminable and modifiable by digital programming signals of a programmer.

24 Claims, 5 Drawing Sheets

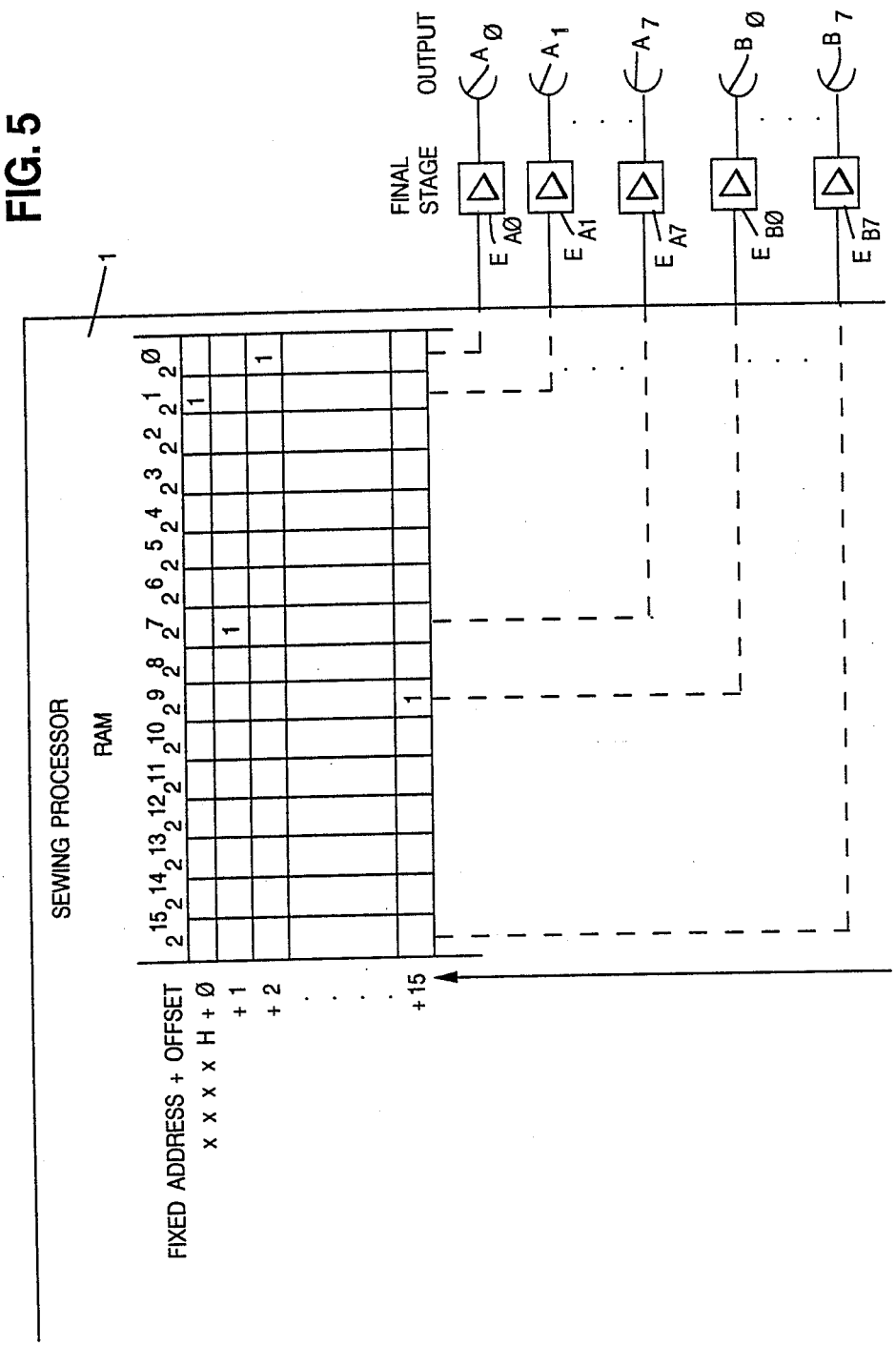

PROCESSOR FOR SEWING MACHINES

This is a continuation application of Ser. No. 887,11 filed as PCT EP85/00620 on Nov. 13, 1985, published as WO86/03034 on May 22, 1986, abandoned.

BACKGROUND OF THE INVENTION

The invention relates to a processor arrangement for sewing apparatus for operating control of at least one sewing device, especially a sewing machine or an automatic sewing mechanism, including accessories (e.g. for thread cutting, thread wiping, feed reversal, presser foot actuation, and the like) and for controlling the number of revolutions of a positioning drive which drives the sewing device.

Positioning drives for sewing devices are known in various designs. Among these are also those which utilize an 8-bit microprocessor for the regulation and control of various operating steps that can be recalled individually (DOS No. 2,938,040).

However, the conventional systems are still burdened, in particular, by the following deficiencies:

1. With the use of a 1-chip microprocessor in a ROM version, all parameters are fixed, or they must be conveyed to the processor by means of externally connected hardware elements, such as potentiometers or trimmers, rotary switches or variable capacitors, programming bridges or programming diodes.

2. Elements for clocking final stages, for example the final stages assigned to the electromagnetic clutch and the electromagnetic brake of a coupling motor provided for the drive mechanism of the sewing device (U.S. Pat. Nos. 3,487,438; 3,599,764; 3,761,790), are fixedly correlated with the final stages; they are located, in the form of networks, outside of the microprocessor and can be reset only in a cumbersome way by means of adjusting steps, but not during the sewing operation.

3. Timing elements for yielding time intervals provided during the course of the sewing operation are built up in the form of external networks and their adjustment, as in the case of the elements for the clocking of final stages, can be performed only in a cumbersome fashion; they are furthermore subject to fluctuations in their timing characteristic, varying from one element to the next.

4. The functional sequences, and individual functions, have final stages fixedly associated with them by way of fixedly defined microprocessor outputs; in case of control component stages of differing designs, this entails a large number of mounting varieties which raises production costs.

5. The essential parts of the devices for speed control and positioning of the sewing device are located outside of the processor and accordingly are very limited in their accuracy by fluctuations from one component to the next and by temperature drifts. Furthermore, again they can be changed in their parameters only by cumbersome adjustment operations.

The invention is based on the object of eliminating the above-discussed deficiencies at least in part, but preferably entirely.

This object has been attained according to this invention by providing that, in a sewing processor arrangement of the type mentioned hereinabove, the operating control characteristics as well as the rotational speed control characteristics can be predetermined and modified by digital programming signals of a programmer.

Advantageously, the present invention includes a long term memory whereby it is possible to write into and retrieve from the memory all of the parameters necessary for at least one sewing operation and for a rotational speed control of the positioning device.

The operating control and rotational speed characteristics can advantageously be stored in the long term memory and be modified by digital programming during operation.

Additionally, an interface through which the parameters can be written into and read out from the long term memory by the digital programming means is provided with the digital programming means including at least one unit provided from a group of units consisting of an external control panel, a programmer, and a higher ranking computer.

The interface may be designed as a parallel interface, and the parameters, for the sewing processor arrangement may include sewing machine parameter data as well as operating data with at least one of the parameters being a code word for the associated sewing machine.

The interface according to the present invention may include means for effecting bit compression of the individual parameter data prior to being written in the long term memory and means for effecting bit expansion of the individual parameter data after having been read out from the long term memory.

Moreover, a means may be provided for modifying a definable subnumber of parameters, with a means also being provided for selectively blocking writing into and reading out of as well as the writing into and reading out of preselected storage locations of the long term memory.

A sewing machine plug or adaptor for recognizing the connected sewing machine by a code word before the beginning of the sewing operation by way of sensor lines is provided and, in case of incompatibility, for transmission of an error code for avoiding erroneous functions and preventing the start of the entire sewing operation or a specific sewing operation.

A passive electrical component, is arranged in the plug or, respectively, adaptor in such a manner that the value of the component can be measured by the control unit and can thereby be identified.

According to the present invention, a single eight-bit microprocessor is provided encompassing all functional elements necessary for a sewing operation such as detection and evaluation of incremental and desired values, light stop signals, photocell and other sensor signals, direct activation of final stages, realization of various stitch counters, and realization of an adaptive digital rotational speed controller with variable parameters.

The sewing processor arrangement of the present invention is characterized in that selectively any function is to be assigned to the outputs of the sewing processor, and, it is possible, by way of the outputs, to clock final stages selectively with different, variable clock ratios.

Independently operable stitch counters are provided and are individually activatable, with independently activatable timing elements being provided with differing time resolutions.

The sewing processor arrangement of the present invention provides for an error code display for error diagnosis, and actual values of the parameters and actual values of status variables can be displayed by way of a programmer or an external control panel.

The sewing processor arrangement of the present invention enables an activation of several sewing devices in parallel by way of a computer correlated to all of the sewing devices, with the common computer being correlated with a primary memory supplying of the data records for the operation of the several sewing devices.

Moreover, each of the several sewing devices exhibits at least one buffer memory to which can be transferred, prior to a sewing operation, the data necessary therefor from the primary memory.

Additionally, each sewing device is associated with a buffer memory which, during intermediate stops of the sewing device, accepts the data from the primary memory which are required for subsequent sewing operations.

It is also possible in accordance with the present invention for each sewing device to be associated with two buffer memories and a set of data for the subsequent sewing operation can be read from the primary memory into respectively one of the buffer memories while the data for the sewing operation that is just being performed being process in the other buffer memory.

Advantageously, light stop values depending upon an angle of rotation of the sewing device pertain to the operating control characteristics predeterminable by digital programming signals, and at least one light barrier adjustable by digital programming signals is associated with the sewing device.

In the system of this invention, the operating control and speed regulating functions are realized and, integrated on a purely digital basis, and concentrated in a microprocessor associated preferably with an EEPROM as a long-term memory (for example, about 10 years storage period). The microprocessor can involve, in a special case, a simple 8-bit microprocessor. By means of the programmer, every functional element in the microprocessor can be supplied, preferably by way of a serial interface, with parameters in a simple and reproducible form, even during operation. Each parameter and each actual value, for example the number of revolutions of the sewing machine or the needle position, can be called up via the programmer or a control panel and displayed. Additionally, in case of an error, an error code display permits a very accurate error diagnosis since all elements are accessible to analysis on a digital basis (in the microprocessor).

The preferably provided bit compression and bit expansion permits improved space utilization of the longterm memory. A sewing processor control unit can automatically identify, by way of a sewing machine plug or adapter, the associated sewing machine in order to prevent any possible destruction erroneous functions in case of differences between control and type of sewing machine. Such an advantageous solution, by the way, is not restricted to sewing processor arrangements with an integrated, digitally programmable operating control and speed regulation, but can be utilized also in other sewing drive mechanisms, for example, drive means as known from DOS No. 2,938,040.

A solution with a single 8-bit microprocessor is particularly economical, and it permits a simple parameter supply to the functional elements.

BRIEF DESCRIPTION OF THE DRAWINGS

The above and other objects, features, and advantages of the present invention will become more apparent from the following description when taken in connection with the accompanying drawings which show, for the purposes of illustration only, one embodiment in accordance with the present invention, and wherein:

FIG. 5 is an illustration of the free correlation of outputs with output functions.

DETAILED DESCRIPTION

Figure 1:
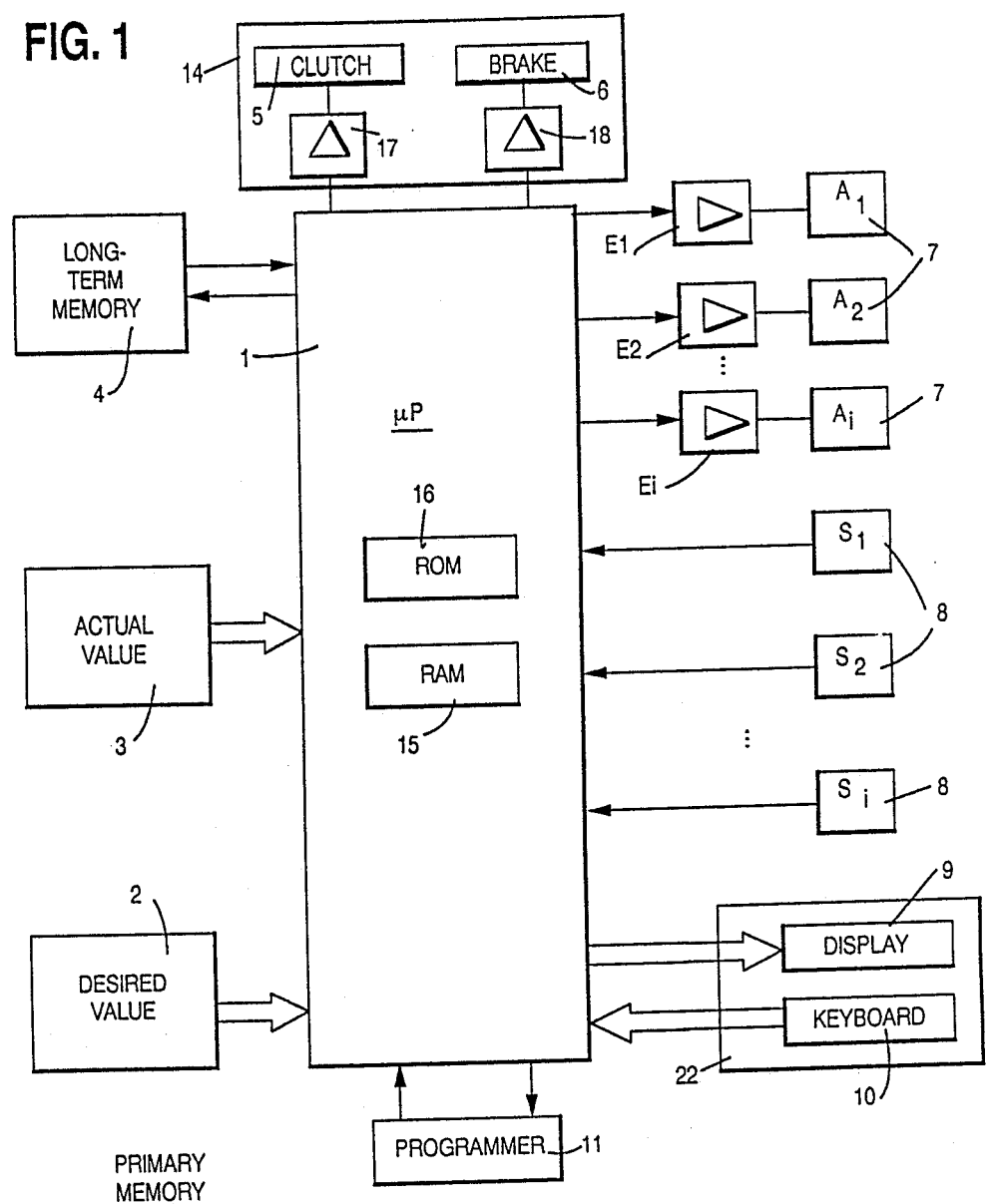
FIG. 1 shows a circuit diagram, in principle, of a programmable digital processor arrangement according to the invention for operating control of automatic sewing devices or sewing machines.

FIG. 1 shows a digitally programmable facility for exerting operating control on different automatic sewing devices or sewing machines, as well as for simultaneous speed regulation and positioning of the respectively associated drive mechanism which latter can preferably be designed as a coupling motor drive. Such drive means are known, inter alia, from the above-mentioned U.S. patents and consequently need not be described in greater detail herein.

The illustrated arrangement comprises a microprocessor 1, the RAM memory 15 and a ROM memory 16. Programming of the facility takes place either by means of a programmer 11 via a serial interface or by means of an external control panel 22 via a parallel interface. Optionally, the operating panel can also be designed for connection by way of a serial interface. The programmer 11 can be designed in the pocket calculator format, i.e. it can be, for example, a simple, commercially available, battery-powered pocket calculator. However, the programmer can also be a higher-ranked computer, for example in the form of a personal computer (PC).

The data that can be written in and read out can be, in particular, sewing machine parameters, such as
  various desired speed values;
  various values for predetermined time sequences (especially delay intervals and pulse lengths);
  various stitch lengths for beginning bartack and final bartack, as well as for the actual seam;
  various control commands for switches serving for controlling the sewing operation, in such a way that certain functions, for example a start/stop function, are triggered or are not initiated upon the recognition of specific conditions, e.g. by the response of light barriers;
  mixed functions, above all combinations of desired values for the speed and/or the stitch length with switch control commands.

In addition, however, it is also possible to put in and read out operating data, for example, in the form of
  piece counts of the sewed items;
  sum totals of stitch numbers for predetermined time intervals;

active and/or resting periods of the sewing machine within a predetermined time interval;

workpiece code of the sewing material being presently subjected to the sewing operation.

It is furthermore possible to write in, by way of the serial interface, plain language instructions for display on LCD or the like to give directions to the seamstress. Examples in this connection are the succession of seams or seam programs or predetermined required production times for certain sewing tasks.

The external control panel has a display 9 and a keyboard 10. The microprocessor 1 is associated with a long-term memory 4 preferably designed as an EEPROM. The positioning drive proper is indicated at 14. This involves a coupling motor drive mechanism with an electromagnetic clutch 5 and an electromagnetic brake 6 which are activated, preferably clocked, directly by the microprocessor 1 via final stages 17 and 18, respectively. The microprocessor 1 receives, likewise on digital basis, input signals from a revolutions counter 3, for example an incremental transducer or tachometer, determining the actual number of revolutions of the positioning drive 14, as well as from a desired value generator 2 indicating the desired speed of the sewing drive mechanism. This generator can be installed, for example, in the conventional pedal of the sewing machine. By way of final stages $E_1, E_2 \ldots E_i$, the microprocessor 1 actuates activators $A_1, A_2 \ldots A_i$, denoted by 7 in their entirety, these activators being associated, in particular, with accessories of the sewing machine for thread cutting, thread wiping, feed reversal, presser foot operation, and the like. Sensor and switch scanners $S_1, S_2 \ldots S_l$ are denoted in total by 8 and supply the microprocessor 1 with sensor and switch scanning signals.

Heretofore customary setting elements, such as potentiometers, timers, rotary switches, programming bridges, programming diodes, variable capacitors, and the like are eliminated, since all of the elements of the present device, such as speed control, positioning, incremental counting and stitch counting, timing members, the sensor and switch scanners, the final stage activation, the clocking of the final stages and activators, etc., operate on a digital basis and are combined in the processor arrangement. The revolutions counter 3 of the sewing drive mechanism, the desired value generator 2, the display 9, the keyboard 10, and the long-term memory 4 are directly connected to the microprocessor 1.

Figure 2:
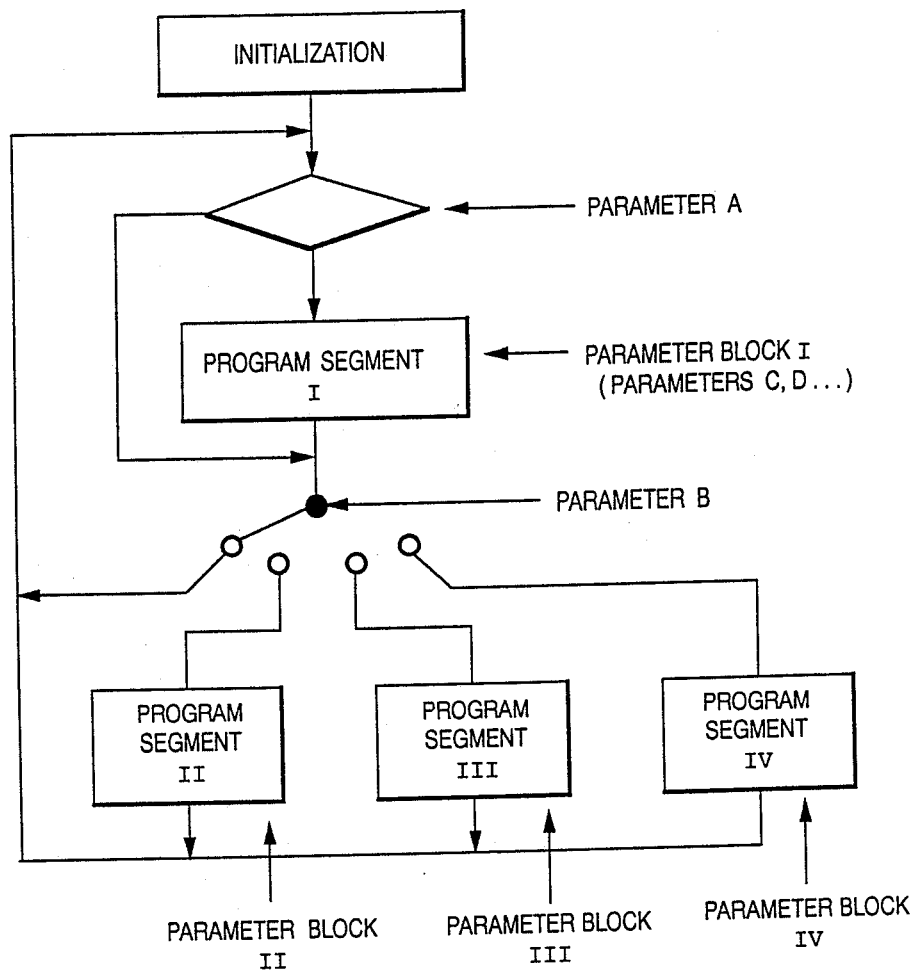
FIG. 2 shows an example of a software structure of the processor arrangement according to FIG. 1 with adjustment possibilities by parameters.

FIG. 2 shows a simple software structure with various program portions (program segments I-IV) which can be linked with one another in dependence on parameters A and B.

Parameter A permits conditional skipping of program segment I whereas parameter B sets one of four jump possibilities. A portion of the parameters from parameter blocks I-IV acts in the same way also within program segments I-IV. The larger portion of these parameters, however, is constituted by variables exerting an influence on program-internal calculations and thus determining directly the voltage-time characteristic at the outputs of the sewing processor (for example pulse duty factors). Each of the program segments services a partial quantity of all outputs present.

Except for the parameters, the entire software structure lies in the ROM memory 16 of the sewing processor 1. All program portions, however, are designed so universally that they are capable of fulfilling, with a suitable choice of the parameters, all of the heretofore known requirements regarding operating control processes of sewing machines or, respectively, automatic sewing devices, and regarding the regulation of the positioning drive 14.

The complete set of parameters resides in the long-term memory 4, preferably an EEPROM. For reasons of saving storage space, the set is present herein in compressed form.

Figure 3:
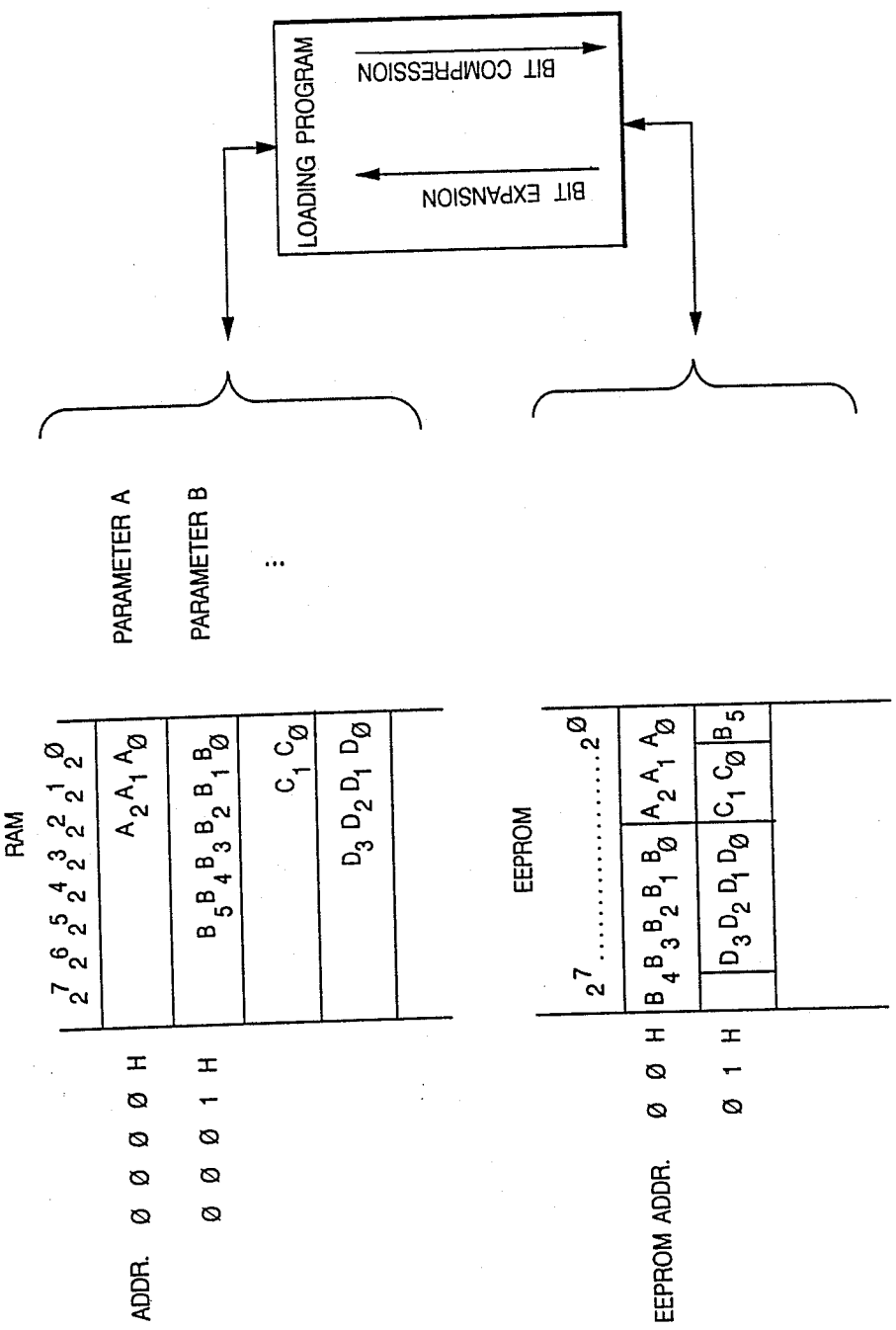
FIG. 3 shows an example of bit compression and bit expansion by the loading program.

A loading program is activated with the actuation of the control unit within an initialization routine of the sewing processor; this program calls up, in succession, the compressed data in the long-term memory 4 per command by way of a serial connection, performs bit expansion, and then writes in the expanded data as parameters into fixedly defined addresses in the RAM memory 15 of the sewing processor 1, as illustrated in FIG. 3.

The various program segments according to FIG. 2 are capable of utilizing the individual parameters in direct memory access, and thus with maximum speed.

Figure 4:
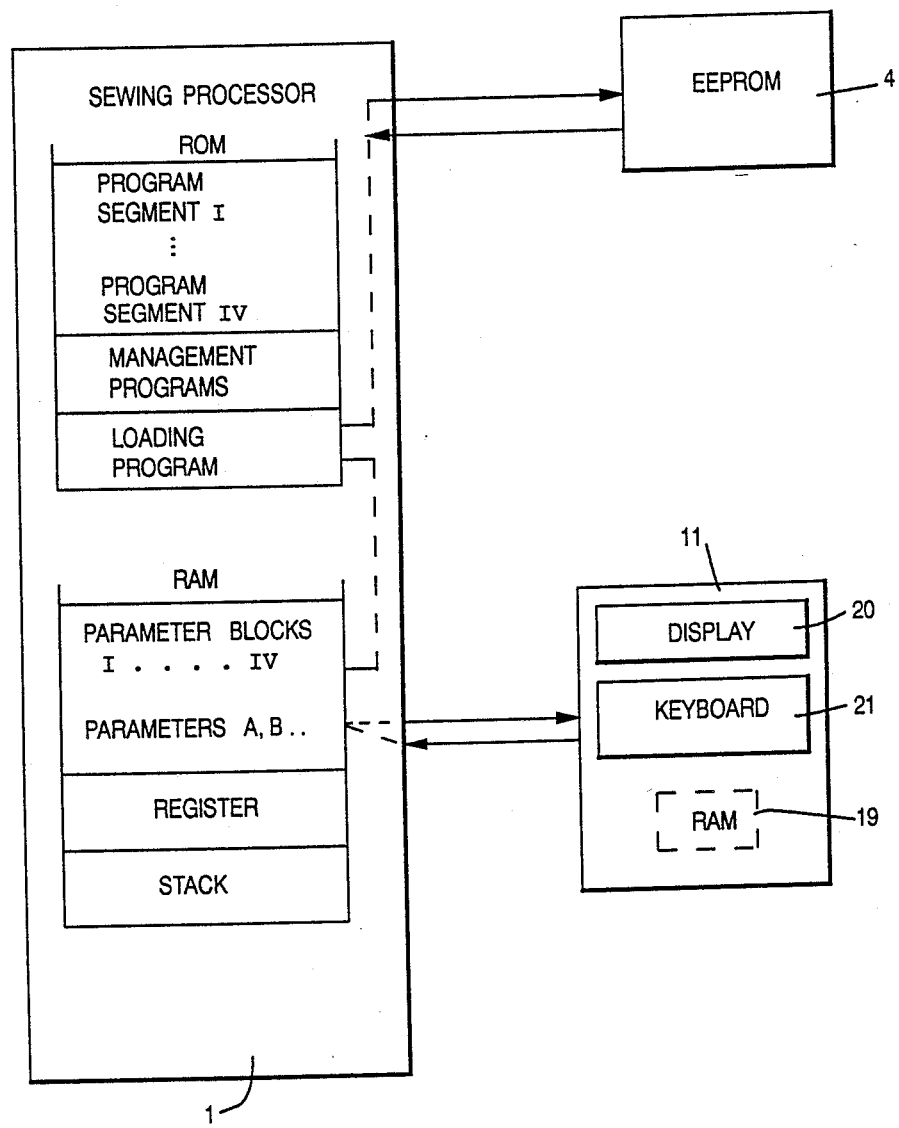
FIG. 4 is an illustration of the collaboration among the sewing processor, the long-term memory, and the programmer.

FIG. 4 shows the illustration of a detail from FIG. 1 and depicts the cooperation among sewing processor 1, long-term memory 4, and programmer 11. Communication between the programmer 11 or a computer and the sewing processor 1 takes place via a serial interface and preferably asynchronously in the software handshake mode. If, per keyboard call-up, a certain parameter is to be displayed from the RAM memory 15 of the sewing processor 1, the programmer 11 transmits a command word to the processor, this word containing in coded form also the RAM address where the desired parameter is located. Within a management routine which is also run through cyclically during a sewing operation, the arrival of a command is recognized, and transfer of the parameter is effected to exactly the same address in a RAM memory 19 of the programmer 11. The processor present herein displays the desired parameter (display block 20) for such a time until a new command is transmitted via a set of keys 21. Condition parameters (for example the actual number of revolutions of the sewing machine, or the actual angular setting at the positioning drive) are recognized by the management routine, after call-up by the programmer 11, as constantly varying values. Transfer to the programmer 11 then takes place cyclically in order to be able to keep the display continuously up to date.

Parameters affecting the characteristic of the operating control of the automatic sewing device (sewing machine), or the regulation of the positioning drive, are likewise transmitted, upon command, to the display in the programmer 11. The thus-displayed value can now be modified manually by means of the keyboard 21 and written in as new information into the RAM memory 15 of the sewing processor 1. The management routine of the sewing processor 1 recognizes this step and activates a loading program which writes the modified parameter, with bit compression, into the long-term memory 4.

A further operating mode of the programmer 11 permits transfer of the entire RAM content from the sewing processor 1 into its own, e.g. statically buffered RAM 19. Thereafter, modifications of parameters are possible even without the sewing processor being connected. At a later point in time, the entire RAM memory 15 of the sewing processor 1 can be newly loaded from the RAM memory 19 of the programmer 11. Subsequently, the loading program is immediately activated, this program newly loading the entire long-term memory 4 after bit compression. Transfers of the entire RAM contents are possible only prior to beginning of the sewing operation.

Partial functions of the programmer 11 can also be taken over by the external control panel 22 in FIG. 1. The keyboard 10 and the display 9 are directly connected to the sewing processor 1 by way of a parallel address data bus. The sewing processor 1 in this case take care, in addition to performing the tasks of operating control and regulating of the drive mechanism, of the cyclic interrogation of the keyboard 10 and the display of the required parameters. Only a defined sub-number of parameters can be modified in this way.

FIG. 5 shows the definition of a special parameter block fixing the correlation of exactly one output function with a specific one of the final stages $E_{A0}$, $E_{A1}$ ... $E_{A7}$, $E_{B0}$ ... $E_{B7}$ which are connected in front of the outputs $A_0$, $A_1$ ... $A_7$, $B_0$ ... $B_7$.

This parameter block (correlating matrix) is realized by a RAM area in the sewing processor 1 with fixed starting address. Each output function is fixedly associated with an address offset. In the data word pertaining thereto, exactly only one of the bits $2^{15}$-$2^0$ is "ONE", with which one of the outputs $A_0$ through $B_7$ can be addressed.

Figure 6:
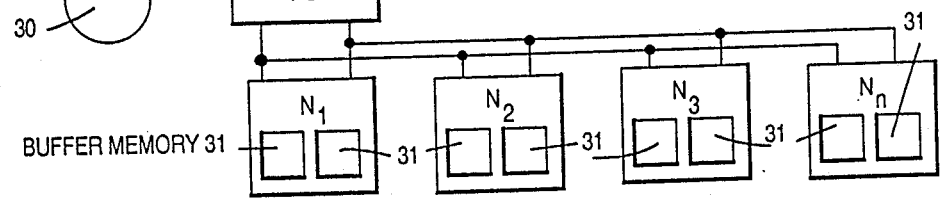
FIG. 6 shows schematically a chained sewing system.

FIG. 6 schematically illustrates a further development of the invention according to which a plurality of sewing machines $N_1$ through $N_n$ are activated in parallel by way of a computer PC, e.g. a personal computer, assigned to all of them in combination. The required digital data are derived in this case from a primary memory 30, for example in the form of a disk memory. Each of the sewing machines is equipped with at least one buffer memory 31. The design can be such, for example, that when using a buffer memory 31, the digital data for the respectively subsequent sewing operation, coming from the primary memory 30, are written into this buffer memory during intermediate stops of the sewing machine, for example while reversing the respective material being sewed. If there are no intermediate stops, or if such intermediate stops are of insufficient duration, then each sewing machine can be provided, in the way indicated in FIG. 5, with two buffer memories 31, the data set for the subsequent sewing operation being written in from the primary memory 30 by way of the computer PC, while the data for the sewing operation being performed at that time are being processed in the other buffer memory 31 (alternating buffer operation). Chaining of the production sequence in accordance with FIG. 6 permits optimum control of flow of material, for example if different, successive sewing steps are to be performed in the sewing machines $N_1$ through $N_n$. If, for example, on account of a breakdown, the sewing machine $N_2$ has processed a lower number of workpieces than the sewing machine $N_1$, the transmission of a corresponding command can take care of reading out, temporarily, the same data sets from the primary memory 30 for the sewing machines $N_2$ and $N_3$, and thus both sewing machines temporarily execute the same operating steps until the prevailing jam has been eliminated.

In order to avoid erroneous response during chained operation corresponding to FIG. 6, if, for example, a sewing machine is newly inserted during data traffic between the computer PC and another sewing machine, a failsafe data protocol is preferably utilized providing, for example, that the drivers of a specific sewing machine respond only to a predetermined number of bytes. In order to keep driverstructure simple, it is advantageous to provide that the number of required bytes is the same for all instances of transmission.

The position pickups of conventional industrial sewing machines or automatic sewing devices are equipped with mechanical light stops in order to trigger specific functions or to transmit specific signals, e.g. the thread cutting signal, in dependence on the respective angular position of the main shaft of the sewing machine. Within the scope of the present invention, in place of such a mechanical light stop, a software shutter or "teach in" shutter is preferably provided in such a way that via the operating panel 22, suitable signals are initiated at the positions corresponding to the shutter edges. Mechanical light stops can thereby be entirely eliminated. An essentially more flexible adaptation to various tasks becomes possible because it is merely necessary to effect a corresponding reprogramming by way of the operating panel.

In a similar way as with a digitally adjustable shutter, it is also possible to work with a digitally tunable light barrier, for example to detect the presence or absence of sewing material, the approach toward the edge of the sewing material, or the like. Such light barriers, designed as reflective or see-through barriers, must be adjusted to the respective type of sewing material. This can be done, within the scope of the invention, likewise by way of the external control panel, and the respective value can be digitally stored in the memory. The stored data value can be retrieved, in the chained system according to FIG. 6, from the primary memory 30 and utilized for any desired one of the sewing machines $N_1$ through $N_n$. The same holds true in case of the chaining system for all other data sets, as long as the sewing machines utilized are each of identical structure.

We claim:

1. Sewing processor arrangement for operational control of at least one sewing device, including auxiliary units, and for rotational speed control of a positioning drive which drives the at least one sewing device, comprising long term memory means for storing operational control characteristics and rotational speed control characteristics, digital programming means for writing into and retrieving from said long term memory means all parameters necessary for at least one sewing operation and for the rotational speed control of the position drive, said parameters including sewing machine parameter data as well as operating data, wherein the operating control and rotational speed control characteristics can be stored in said long term memory means and modified by the digital programming means during operation, said sewing processor arrangement further including an interface through which the parameters can be written into and read out from the long term memory means by said digital programming means, and a sewing machine plug or adaptor for recognizing a connected sewing device by a code word before beginning a sewing operation by sensor lines and, in case of incompatibility, for transmission of an error code for avoiding erroneous functions and preventing a start of the entire sewing operation or a specific sewing operation.

2. Sewing processor arrangement according to claim 1, wherein said digital programming means includes at least one unit from a group of units including an external control panel, a programmer, and a higher ranking computer.

3. Sewing processor arrangement according to claim 1, wherein the interface is designed as a parallel interface.

4. Sewing processor arrangement according to claim 1, wherein the interface is designed as a serial interface.

5. Sewing processor arrangement according to claim 1 wherein said interface includes means for effecting bit compression of individual parameter data prior to being written into the long term memory means and means for effecting bit expansion of the individual parameter data after having been read out from the long term memory means.

6. Sewing processor arrangement according to claim 1 including means for modifying a definable subnumber of parameters.

7. Sewing processor arrangement according to claim 1, including means for selectively blocking writing into and/or reading out of preselected storage locations of the long term memory means.

8. Sewing processor arrangement according to claim 1, wherein a passive electrical component is arranged in the plug or adaptor in such a way that a value of the passive electrical component can be measured by the said sewing processor arrangement and can thereby be identified.

9. Sewing processor arrangement for operational control of at least one sewing device, including auxiliary units, and for rotational speed control of a positioning drive which drives the at least one sewing device, comprising long term memory means for storing operating control characteristics and rotational speed control characteristics, and digital programming means for writing into and retrieving from said long term memory means all parameters necessary for at least one sewing operation and for the rotational speed control of the positioning drive, wherein a single 8-bit microprocessor is provided encompassing all functional elements necessary for the sewing operation, such as:
- detection and evaluation of incremental and desired values, light stop signals, photocell and other sensor signals,
- direct activation of final stages,
- realization of various stitch counters, and
- realization of an adaptive digital rotational speed controller with variable parameters.

10. Sewing processor arrangement according to claim 9, wherein any function is selectively assigned to outputs of the sewing processor arrangement.

11. Sewing processor arrangement according to claim 10, wherein said sewing processor arrangement, by the outputs thereof, permits a clocking of final stages selectively with different, variable clock ratios.

12. Sewing processor arrangement according to claim 9, wherein said sewing processor arrangement defines stitch counters that operate independently of one another and are individually activatable.

13. Sewing processor arrangement according to claim 9, wherein timing elements with differing time resolutions are independently activatable.

14. Sewing processor arrangement according to claim 9, wherein an error code display is provided for an error diagnosis.

15. Sewing processor arrangement according to claim 9, wherein actual values of parameters and actual values of status variables can be displayed by said digital programming means or an external control panel.

16. Sewing processor arrangement according to claim 9, wherein several sewing devices are activated in parallel by way of a computer common to all of said several sewing devices.

17. Sewing processor arrangement according to claim 16, wherein the computer common to all of the sewing devices is correlated with a primary memory supplying data records for and operation of the several sewing devices.

18. Sewing processor arrangement according to claim 17, wherein each of the several sewing devices includes at least one buffer memory to which can be transferred, prior to a sewing operation, data necessary therefor from the primary memory.

19. Sewing processor arrangement according to claim 18, wherein each sewing device is associated with a buffer memory for accepting data from the primary memory required for a subsequent sewing operation during intermediate stops of the sewing device.

20. Sewing processor arrangement according to claim 18, wherein each sewing device is associated with two buffer memories, and wherein a set of data for a subsequent sewing operation can be read from the primary memory into one of the respective buffer memories while data for a sewing operation that is just being performed are being processed in the other buffer memory.

21. Sewing processor arrangement according to claim 9, wherein light stop values dependent on an angle of rotation of the sewing device pertain to the operating control characteristics predeterminable by digital programming signals.

22. Sewing processor arrangement according to claim 9, wherein at least one light barrier adjustable by digital programming signals is associated with the sewing device.

23. Sewing processor arrangement according to claim 8, wherein the passive electrical component includes a resistor means, a resistance value of which can be measured by said sewing processor arrangement.

24. Sewing processor arrangement according to claim 15, wherein the actual values of status variables include at least one of a number of revolutions or a needle position of the sewing device.

* * * * *